(12) United States Patent
Kim et al.

(10) Patent No.: US 12,194,800 B2
(45) Date of Patent: Jan. 14, 2025

(54) DRIVING MODULE OF AUTONOMOUS MOBILE ROBOT

(71) Applicant: ROBOTIS CO., LTD., Seoul (KR)

(72) Inventors: Byoung Soo Kim, Seoul (KR); In Young Ha, Seoul (KR); Woo Sik Yang, Seoul (KR); Han Cheol Cho, Gyeonggi-do (KR); Young Rae Park, Seoul (KR)

(73) Assignee: ROBOTIS CO, LTD., Seoul (KR)

( * ) Notice: Subject to any disclaimer, the term of this patent is extended or adjusted under 35 U.S.C. 154(b) by 198 days.

(21) Appl. No.: 17/741,815

(22) Filed: May 11, 2022

(65) Prior Publication Data

US 2022/0266649 A1    Aug. 25, 2022

Related U.S. Application Data

(63) Continuation of application No. PCT/KR2020/016670, filed on Nov. 24, 2020.

(30) Foreign Application Priority Data

Nov. 25, 2019  (KR) .................. 10-2019-0152539
Mar. 18, 2020  (KR) .................. 10-2020-0033131

(51) Int. Cl.
*B60G 17/06* (2006.01)
*B60G 5/06* (2006.01)

(52) U.S. Cl.
CPC .............. *B60G 17/06* (2013.01); *B60G 5/06* (2013.01); *B60G 2400/252* (2013.01); *B60G 2400/64* (2013.01); *B60G 2500/10* (2013.01)

(58) Field of Classification Search
CPC .. B62D 57/028; B62D 55/075; B62D 55/024; B25J 5/007; B25J 9/1664; B25J 19/0091; B60G 3/285

(Continued)

(56) References Cited

U.S. PATENT DOCUMENTS 4,993,912 A * 2/1991 King ................ B62D 61/12
                                                89/929
8,030,873 B2 * 10/2011 Wilson ............ B62D 57/032
                                                318/568.2

(Continued)

FOREIGN PATENT DOCUMENTS

JP    2004-136418 A    5/2004
JP    2011-235692 A    11/2011

(Continued)

OTHER PUBLICATIONS

WO2022203397A1 English translation and Original Document retrieved Jan. 16, 2024, published 2022 (Year: 2022).*

*Primary Examiner* — Paul N Dickson
*Assistant Examiner* — Caitlin Anne Miller
(74) *Attorney, Agent, or Firm* — Dinsmore & Shohl LLP; Yongsok Choi, Esq.

(57) ABSTRACT

A driving module of an autonomous mobile robot is provided. The driving module includes a first wheel in constant contact with ground or road surface and having a first rotational axis; second and third wheels constrained in their positions relative to each other; a rear bar on which a second rotational axis of the second wheel is positioned at one end, an upper axis portion is provided at the other end, and an intermediate axis portion is provided in the middle; a front bar on which a third rotational axis of the third wheel is positioned at one end, in which the other end of the front bar is pivotably coupled to the intermediate axis portion; and a suspension unit of which one end is pivotably coupled to the upper axis portion and the other end is pivotably coupled to the third rotational axis or the front bar.

7 Claims, 6 Drawing Sheets

(58) Field of Classification Search
USPC .......................................... 180/8.2; 280/5.28
See application file for complete search history.

(56) References Cited

U.S. PATENT DOCUMENTS

| | | | |
|---|---|---|---|
| 10,239,378 B2* | 3/2019 | Liivik | .................. G05D 1/0238 |
| 10,967,926 B2* | 4/2021 | Liivik | .................. B62D 57/024 |
| 11,124,233 B1* | 9/2021 | Kurczewski | ............. B60G 9/02 |
| 11,858,570 B2* | 1/2024 | Yang | .......................... B25J 5/00 |
| 2015/0374564 A1* | 12/2015 | Sutton | .................... A61G 5/128 |
| | | | 280/657 |
| 2021/0145667 A1* | 5/2021 | Batke | ..................... A61G 5/043 |
| 2022/0266933 A1* | 8/2022 | Kim | ..................... B62D 57/028 |

FOREIGN PATENT DOCUMENTS

| | | | |
|---|---|---|---|
| KR | 10-2004-0008373 A | | 1/2004 |
| KR | 10-2013-0045290 A | | 5/2013 |
| KR | 10-2015-0064578 | | 6/2015 |
| WO | WO-2022203397 A1 | * | 9/2022 |

* cited by examiner

[FIG. 3A]
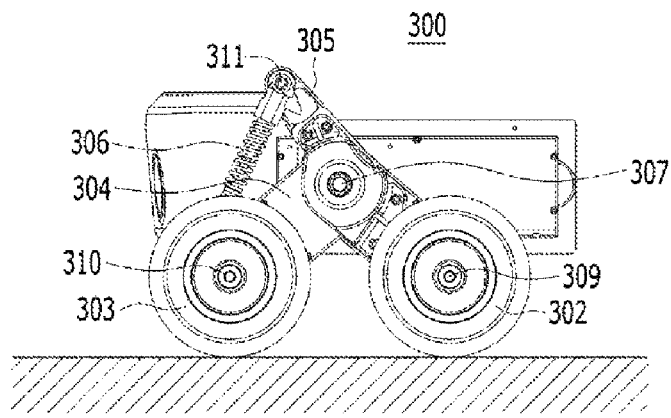
[FIG. 3B]
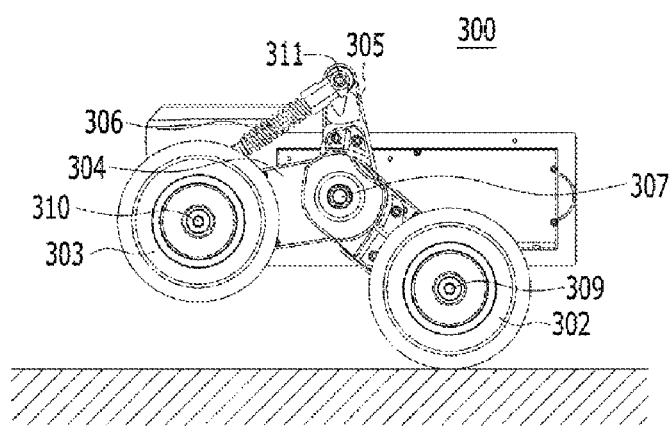
[FIG. 3C]
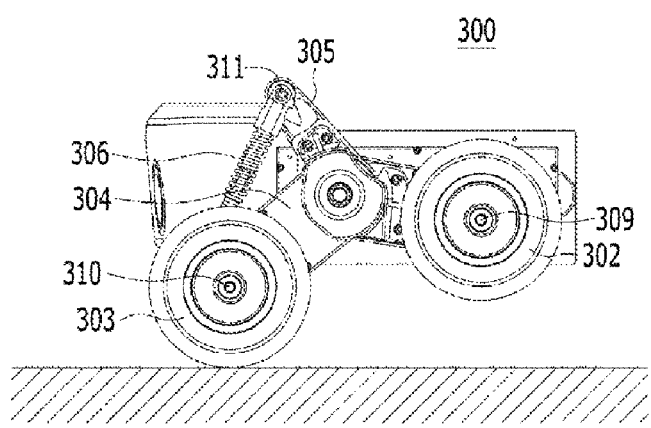

[FIG. 4A]
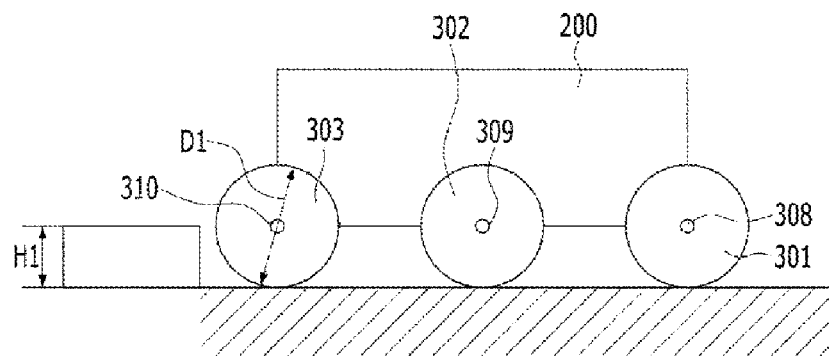
[FIG. 4B]
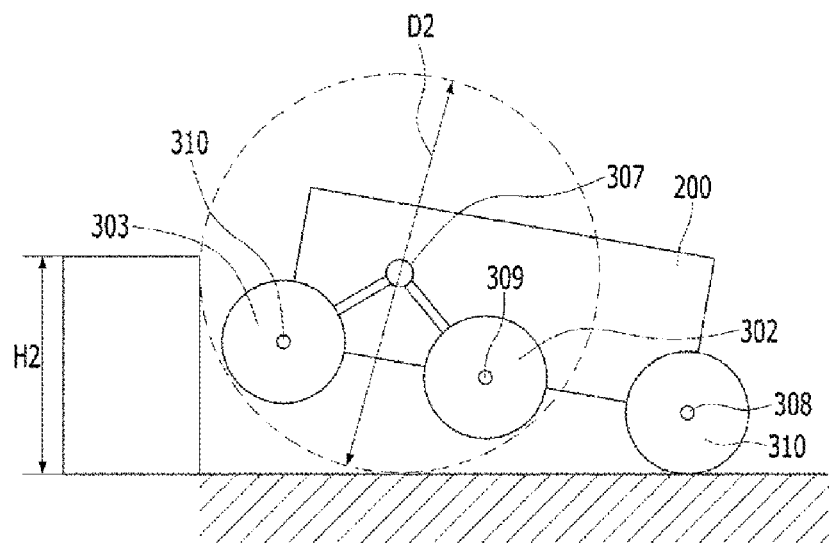

DRIVING MODULE OF AUTONOMOUS MOBILE ROBOT

CROSS-REFERENCE TO RELATED APPLICATIONS

This application is a continuation of International Application No. PCT/KR2020/016670 filed on Nov. 24, 2020, which claims priority to Korean Patent Application No. 10-2019-0152539 filed on Nov. 25, 2019 and Korean Patent Application No. 10-2020-0033131 filed on Mar. 18, 2020, the entire contents of which are herein incorporated by reference.

TECHNICAL FIELD

The present disclosure relates to a driving module of an autonomous mobile robot, and more particularly, to a driving module of an autonomous mobile robot that is capable of autonomously generating and moving a path in indoor and outdoor environments without requiring a user to input a specific driving path, in which the driving module is capable of easily overcoming an obstacle or structure such as a stair, a step, or the like positioned on the ground or road surface and has improved driving performance.

BACKGROUND ART

Conventionally, stationary industrial robots are widely used, but with the recent technological development of sensors, big data, and artificial intelligence, and the rapid development of autonomous driving technology using them, a number of multi-purpose robots that can be used in various indoor and outdoor environments are being developed.

A representative example of the indoor autonomous mobile robot is a robot vacuum cleaner, and various other robots have also been developed, ranging from logistics, airport/hotel service, guidance, security, as well as pet robots. While indoor environment has relatively good conditions for driving, it is necessary to recognize and avoid possible collision with surrounding objects and people while moving.

Outdoor autonomous mobile robots are particularly difficult to operate in that they are placed in various environmental conditions. For example, it is difficult to achieve successful autonomous driving without taking various factors such as road surface conditions, sudden appearance of pedestrians or companion animals, identification of automobile roads and pedestrian roads, weather changes, and the like into consideration.

In particular, a logistics robot used for the purpose of delivery or cargo transportation should be designed to avoid or overcome the step or stair while also taking consideration of load conditions.

However, by simply avoiding the step or stair, it will be difficult to set a driving path and in many cases, it is impossible to drive to the final destination. In addition, in order to overcome the step or stair, for example, the radius of the wheel can be increased or a separate driving assistance device can be provided, but in these cases, the autonomous mobile robot may inevitably become large or economical efficiency may be reduced, and various design difficulties may also occur. In particular, in the case of outdoor driving, overcoming vertical obstacles such as sidewalk-driveway boundary stones that are approximately 20 cm high is one of the technical challenges that must be solved for autonomous mobile robots.

As described above, there is a need for a new driving module of autonomous mobile robot, which is capable of easily overcoming obstacles or structures on the ground or the road surface which are inevitably encountered during autonomous driving, and also maintaining the autonomous mobile robot compact and without compromising driving performance.

The background technology of the present disclosure is disclosed in Korean Patent No. 10-0690669, and Korean Patent Laid-Open Nos. 10-2018-0044475, 10-2019-0078126, and 10-2018-0130157.

SUMMARY

Technical Problem

The technical problem to be achieved by the present disclosure is to provide a driving module of an autonomous mobile robot that is capable of autonomously generating and moving a path in indoor and outdoor environments without requiring a user to input a specific driving path, in which the driving module is capable of easily overcoming an obstacle or structure such as a stair, a step, or the like positioned on the ground or road surface and has improved driving performance.

The technical problem to be achieved in the present disclosure is not limited to the technical problem described above, and other technical problems that are not mentioned herein will be clearly understood by those skilled in the art to which the present disclosure belongs from the following description.

Technical Solution

In order to achieve the above technical problem, an embodiment of the present disclosure provides a driving module of an autonomous mobile robot, which may include a first wheel in constant contact with a ground or a road surface and having a first rotational axis, a second wheel and a third wheel constrained in their positions relative to each other, a rear bar on which a second rotational axis of the second wheel is positioned at one end, an upper axis portion is provided at the other end, and an intermediate axis portion is provided in the middle, a front bar on which a third rotational axis of the third wheel is positioned at one end, wherein the other end of the front bar is pivotably coupled to the intermediate axis portion, and a suspension unit of which one end is pivotably coupled to the upper axis portion and the other end is pivotably coupled to the third rotational axis or the front bar.

In an embodiment of the present disclosure, the intermediate axis portion may be provided in line with a swing drive axis that is swingably provided in a lower module that forms a main body of the autonomous mobile robot.

In an embodiment of the present disclosure, a control unit may be further provided, which may control a driving operation of the autonomous mobile robot, in which the control unit may control a swinging motion of the front bar and the rear bar about the swing drive axis to adjust whether or not the second wheel and the third wheel are in contact with the ground or the road surface.

In an embodiment of the present disclosure, the control unit may control such that, i) in a general driving, or when a height of a step placed on the ground or the road surface is less than a radius of the third wheel, the driving is performed while both the second wheel and the third wheel are in contact with the ground or the road surface, ii) when the height of the step placed on the ground or the road surface is greater than the radius of the third wheel and less than a swinging motion radius, climbing the step is performed while the second wheel remains in a contacted state with the ground or the road surface and the third wheel is lifted from the ground or the road surface and maintained in a non-contacted state, and iii) when the height of the step on the ground or the road surface is greater than the swinging motion radius, a signal is generated, indicating that it is impossible to climb the step.

In an embodiment of the present disclosure, the control unit may adjust whether or not the second wheel and the third wheel are in contact with the ground or the road surface to variably control a damping force of the suspension unit.

In an embodiment of the present disclosure, the control unit may control such that, i) when a load applied to the lower module is less than a predetermined value, both the second wheel and the third wheel are in contact with the ground or the road surface to decrease a pre-load applied to the suspension unit, and ii) when the load applied to the lower module is equal to or greater than the predetermined value, the second wheel is lifted from the ground or the road surface to a non-contacted position and the third wheel is in contact with the ground or the road surface, to increase the pre-load applied to the suspension unit.

In an embodiment of the present disclosure, the second wheel and the third wheel may have the same radius.

In an embodiment of the present disclosure, a distance from the intermediate axis portion to the second rotational axis and a distance from the intermediate axis portion to the third rotational axis may be equal to each other.

In order to achieve the above technical object, according to another embodiment of the present disclosure, a driving module of an autonomous mobile robot is provided, which may include a first wheel in constant contact with a ground or a road surface and having a first rotational axis, a second wheel having a second rotational axis, and a third wheel having a third rotational axis, in which the second and third wheels may be constrained to each other so as to be able to swing integrally about an intermediate axis portion positioned separately from the second and third rotational axes, the driving module may further include a suspension unit connected to the second wheel or the third wheel and having a variable damping force, and whether or not the second wheel and the third wheel are in contact with the ground or the road surface may be adjusted according to the swinging motion, and the damping force of the suspension unit is varied accordingly.

Advantageous Effects

According to an embodiment of the present disclosure, it is possible to provide a driving module of an autonomous mobile robot that is capable of autonomously generating and moving a path in indoor and outdoor environments without requiring a user to input a specific driving path, in which the driving module is capable of easily overcoming an obstacle or structure such as a stair, a step, or the like positioned on the ground or road surface and has improved driving performance.

In addition, with the driving module of the autonomous mobile robot according to the embodiment of the present disclosure, the size of the autonomous mobile robot can be kept compact, no constraint is imposed on the design of the robot, and driving performance can be maintained or improved.

It should be understood that the effects of the present disclosure are not limited to the effects described above, and include all effects that can be inferred from the configurations of the disclosure described in the detailed description or claims of the present disclosure.

BRIEF DESCRIPTION OF THE DRAWINGS

FIGS. 3A, 3B, 3C are detailed operation diagrams of a driving module of the autonomous mobile robot according to FIG. 1.

FIGS. 4A and 4B are schematic explanatory views illustrating a process of the driving module of FIG. 3 climbing a step.

DETAILED DESCRIPTION

Figure 1:
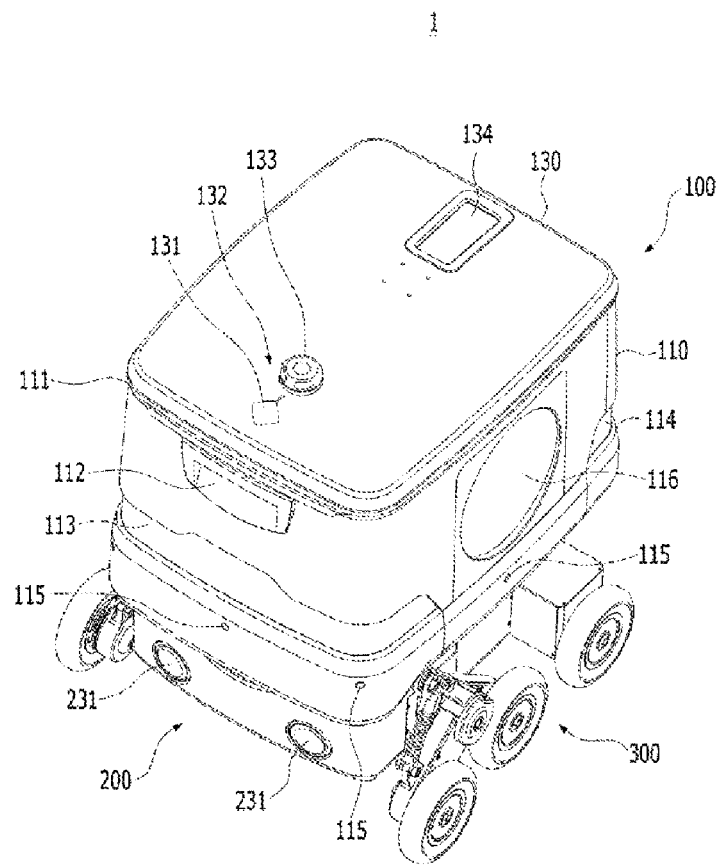
FIG. 1 is a perspective view of an autonomous mobile robot according to an embodiment of the present disclosure.

Hereinafter, the present disclosure will be described with reference to the accompanying drawings. However, the present disclosure can be implemented in a variety of different forms, and therefore, should not be limited to the embodiments described herein. In the following description, parts that are irrelevant to the present disclosure are omitted to clearly describe the disclosure, and the same or similar elements are denoted with the same or similar reference numerals throughout the description.

Throughout the description, when a portion is described as being "connected (joined, contacted, coupled)" to another portion, it includes not only a circumstance when the portions are "directly joined", but also a circumstance when the portions are "indirectly connected" via another member present therebetween. In addition, when a portion is described as "comprising (including)" an element, unless specified to the contrary, it intends to mean that the portion may additionally include another element, rather than excluding the same.

The terms used herein are only for describing certain exemplary embodiments, and not intended to limit the scope of the disclosure. Unless otherwise specified, a singular expression includes a plural expression. The term "comprise" or "have" as used herein is intended to designate an existence of features, numbers, steps, operations, elements, components or a combination of these, and accordingly, this should not be understood as precluding an existence or a possibility of adding one or more of other features, numbers, steps, operations, elements, components or a combination of these.

Embodiments of the present disclosure will be described in detail below with reference to the accompanying drawings.

Figure 2:
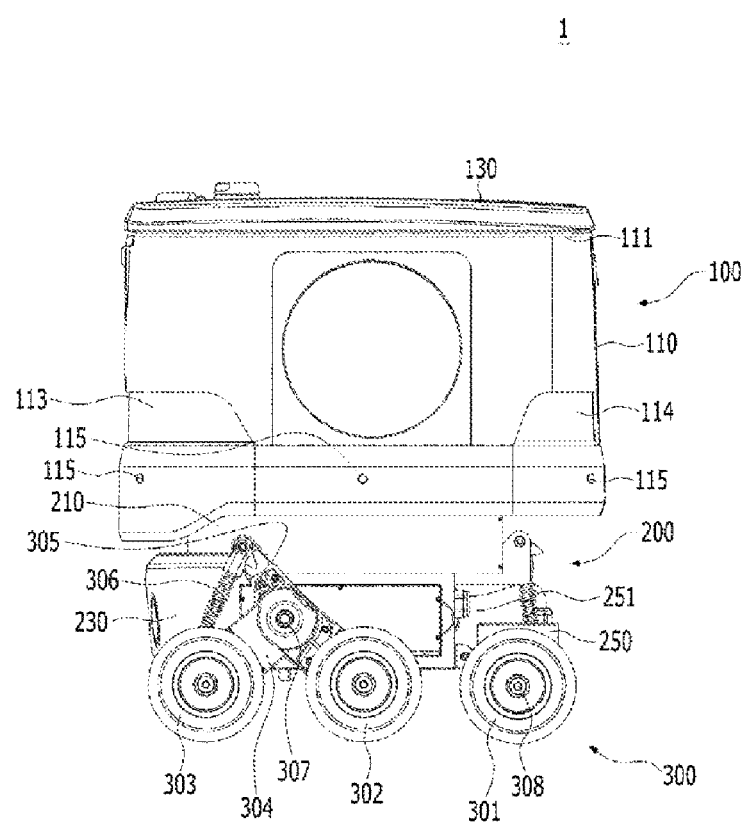
FIG. 2 is a side view of the autonomous mobile robot according to FIG. 1.

FIG. 1 is a perspective view of an autonomous mobile robot according to an embodiment of the present disclosure, and FIG. 2 is a side view of the autonomous mobile robot according to FIG. 1.

As illustrated, an autonomous mobile robot 1 may include an upper module 100, a lower module 200, and a driving module 300.

In the present disclosure, the autonomous mobile robot collectively refers to robots that are capable of autonomously generating a path without requiring a user to input a specific driving path and moving in indoor and outdoor environments, and can be used for purposes such as logistics, advertising, guidance, pets, security, cleaning, transportation, hobbies, and the like, without limitation. In addition, it should be understood that all cases when the user inputs the starting point and the destination, sets driving conditions (e.g., restriction of driving during certain hours), restricts or sets part of the driving path (e.g., restricts driving on automobile roads, intersections, or the like, or allows driving only under the user's supervision), or when the user controls the robot's driving in some driving paths, and the like also fall within the scope of the autonomous mobile robot of the present disclosure.

The upper module 100 may have a cargo space provided therein, and may be provided with a cover 130. The lower module 200 may be positioned under the upper module 100 and provide a driving force to the driving module 300.

The driving module 300 may be provided in the lower module 200. The driving module 300 may include plural pairs of wheels 301; 302; and 303 that may asynchronously contact a road surface or ground to overcome a bump or a stair.

This will be explained in more detail as follows. The upper module 100 may include a main body 110 including the cargo space provided therein, and the cover 130 openably connected to an upper side of the main body 110.

An indicator light 111 may be provided on an upper circumference of the main body 110. The indicator light 111 may be provided along the entire circumference of a top side of the main body 110, and may be formed of a plurality of LEDs. The indicator light 111 may indicate a state of the autonomous mobile robot 1 to the outside. To this end, the indicator light 111 may have a plurality of compartments and express a plurality of colors. By using the indicator light 111, it is possible to indicate that the autonomous mobile robot 1 is currently driving, or indicate a driving condition such as an autonomous driving (automatic driving/manual driving), for example. In addition, a driving direction (forward movement, backward movement, left turn, right turn, turn in place, and the like) may be externally indicated, or a driving speed may be indicated (e.g., blue at low speed, red at high speed, and the like), or other various driving conditions or driving states may be externally indicated. For example, while the autonomous mobile robot 1 is being charged, the charged state of the battery may be externally indicated, or the remaining amount of the battery may be externally indicated during standby.

A camera unit 112 for omni-directional monitoring may be provided on a front side of the main body 110. The camera unit 112 may sense an obstacle in front. The camera unit 112 may include a camera or a distance sensor, and may further include lighting. In addition, a separate member may be included to prevent foreign substances, rainwater, or the like from coming into contact with the camera unit 112 or to remove foreign substances, rainwater, or the like adhered onto the camera unit 112. The camera or distance sensor provided in the camera unit 112 may face forward and downward from the main body 110, and may be provided to be drivable to change an installed direction, or to control a direction.

A first protection part 113, which may be transparent or translucent, may be provided on the front side of the main body 110. As illustrated in FIG. 1, the first protection part 113 may be provided along the entire front side of the main body 110 and extended partially to the lateral sides, but is not limited to such shape.

A second protection part 114, which may be transparent or translucent, may be provided on a rear side of the main body 110. As illustrated in FIG. 1, the second protection parts 114 may be separately provided at corners where the rear side and the lateral sides of the main body 110 meet each other, respectively.

A camera (not illustrated) may be installed inside the first protection part 113 and the second protection parts 114. A plurality of cameras may be installed, such as, for example, a total of four cameras may be installed at each corner of the main body 110. As long as there is no problem in recognizing the external environment to detect dangerous substances or dangerous conditions, and setting the driving path, the installation positions of the cameras, how many of them are installed, and the like is not particularly limited.

A blower (not illustrated) may be provided inside the main body 110 to respond to various environmental conditions, such as weather conditions and the like. For example, the blower may be a structure that includes a fan, and may include a blower passage.

An infrared sensor 115 may be provided in the main body 110. A plurality of infrared sensors 115 may be installed. For, example, a total of eight sensors may be installed, including three on the front side of the main body 110, three on the rear side of the main body 110, and one on one lateral side and one on the other lateral side of the main body 110. As long as there is no problem in recognizing surrounding objects, people, pets, and the like and detecting their movements, the installation positions of the infrared sensor 115, how many of them are installed, and the like is not particularly limited.

A display unit 116 may be provided on the lateral side of the main body 110. The installation position of the display unit 116 is not particularly limited, and the driving state, driving conditions, and the like of the autonomous mobile robot 1 may be displayed to the outside through the display unit 116. For example, it may display moving destination or current driving speed of the autonomous mobile robot 1, whether or not cargo is included, and the like. In addition, through the display unit 116, it is possible to advertise or convey information for various purposes.

Although not illustrated, a cargo space may be provided inside the main body 110. In order to provide such a cargo space, a basket for storing cargo may be provided inside the main body 110 while being spatially separated from various members inside the main body 110. In addition, devices for insulation, refrigeration, and freezing purposes may be provided inside for transporting food or the like.

In addition, a pressure sensor such as a load cell or the like may be provided inside the main body 110 to detect the presence or absence of cargo and control driving conditions according to the weight of the cargo. In addition, an internal camera for detecting the presence or absence of cargo, or displaying or transmitting the status and appearance of the cargo to the outside may be provided.

In addition, a sealing member for preventing rainwater ingress may be provided on an inner upper end of the main body 110. In addition, a rain gutter or a rainwater drainage pipe may be provided on the inner upper end of the main body 110 to let out the received rainwater.

The cover 130 may be openably connected to the upper side of the main body 110. For example, the cover 130 may be hinged to a portion of the front side of the main body 110, and an actuator or other driving means may be provided to open and close the cover 130.

The cover 130 may include an antenna 131 for external communication or GPS connection, a LiDAR 132 that can precisely sense the surrounding environment and the movement of the autonomous mobile robot 1, a microphone 133, and a display panel 134. In addition, a speaker or other members may be further provided. For example, by installing a sensing means such as a distance sensor, a camera, or the like, it is also possible to open the cover 130 after recognizing obstacles above the cover 130 and confirming that there is no problem in opening the cover 130.

A separate waterproof structure may be provided to prevent externally exposed parts such as the antenna 131, the LiDAR 132, the microphone 133, the display panel 134, and the like from exposure to the external environment such as rainwater to be specific.

The microphone 133 may be a directional microphone, or may be a microphone that is capable of sensing the position of a sound source using a plurality of microphones.

The display panel 134 is a member capable of exchanging information with a user through the display, and may be a smart phone or a smart pad, for example. For example, for cargo transport, the user (orderer) is able to know that the cargo ordered by the user (orderer) is stored in the autonomous mobile robot 1, and then open the cover 130 by identifying himself/herself by inputting a password on the display panel 134, for example, and take out the ordered cargo.

The cover 130 may be hinged to the front side of the main body 110, and may include a protrusion provided with a handle on the rear side of the main body 110 for the user to easily open and close the cover 130.

The lower module 200 may be provided under the upper module 100. The lower module 200 may include a connection unit 210, a front driving unit 230, and a rear driving unit 250.

The connection unit 210 may be coupled to a lower end of the upper module 100, and connected to the driving module 300 through the front driving unit 230 and the rear driving unit 250 to serve as support for them.

The front driving unit 230 may include a driving unit that provides driving force to the front wheels, that is, to the second wheel 302 and the third wheel 303 of the driving module 300, and controls positions or rotational force thereof. The driving unit may be a motor, for example.

A lighting 231 may be provided on a front side of the front driving unit 230. The lighting 231 may illuminate the front side of the autonomous mobile robot 1, and may also serve to allow surrounding people to be aware of the existence or movement of the autonomous mobile robot 1.

The rear driving unit 250 may include a driving unit that provides a driving force to the rear wheel, that is, to the first wheel 301 of the driving module 300, and controls position or rotational force thereof. The driving unit may be a motor, for example.

A rear suspension unit 251 may be provided between the rear driving unit 250 and the connection unit 210 to provide a suspension to the first wheel 301. The rear suspension unit 251 may include a damper and a spring. In addition, although not illustrated, other members for steering or suspension, such as a torsion beam, may be included in the rear driving unit 250.

The driving module 300 may be provided in the lower module 200, and may include a plurality of wheels, that is, the first wheel 301, the second wheel 302, and the third wheel 303, to overcome a bump or a stair. In an example, the first wheel 301, the second wheel 302, and the third wheel 303 may be installed in pairs on the left and right sides of the autonomous mobile robot 1, respectively. To this end, the first wheel 301, the second wheel 302, and the third wheel 303 may include two driving wheels provided on the same axis.

The first wheel 301, the second wheel 302, and the third wheel 303 may be connected to separate driving units such as motors respectively so as to be individually driven. Such individual drive control enables various operations such as forward movement, backward movement, left turn, right turn, turn in place, and the like. In addition, it is possible to control the driving module 300 in consideration of various environmental conditions such as road surface conditions, presence or absence of surrounding pedestrians, and the like.

Figure 5:
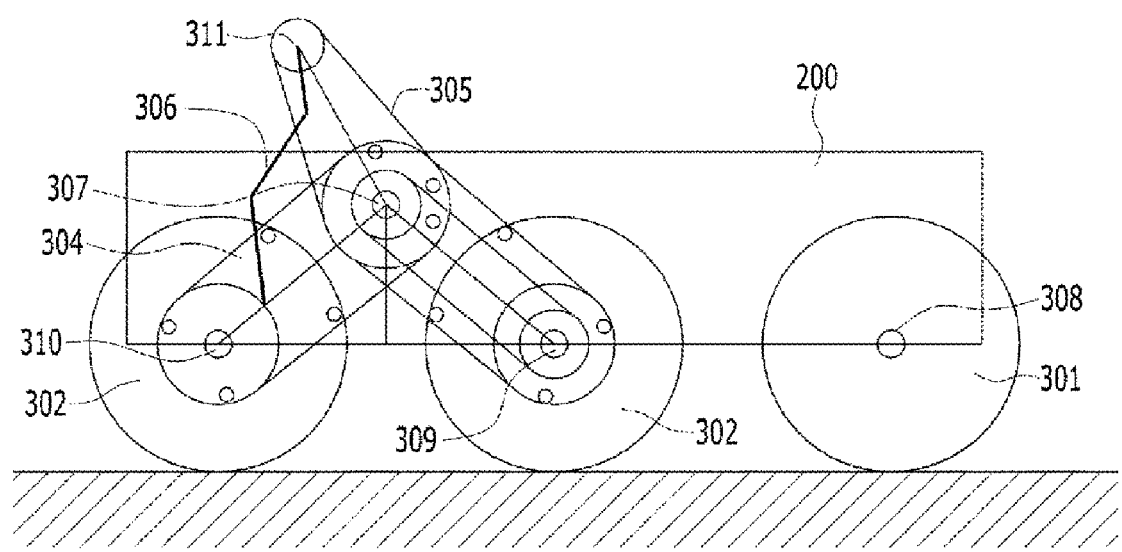
FIGS. 5 and 6 are schematic explanatory views illustrating the driving module of FIG. 2 variably controlling damping force.
Figure 6:
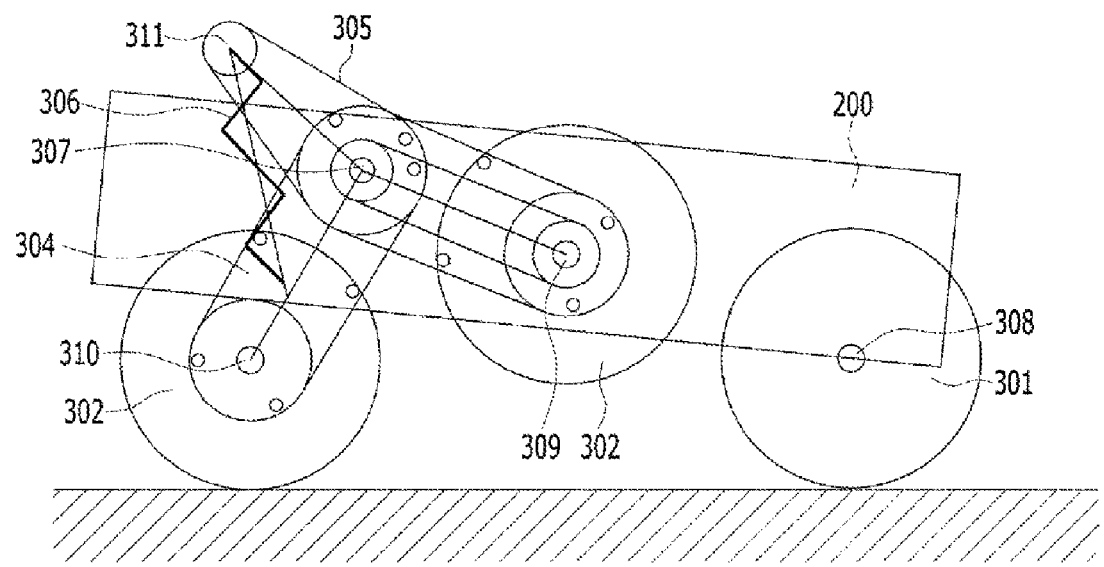

Hereinafter, the configuration and operation of the driving module 300 will be described in more detail with reference to the drawings. FIG. 3 is a detailed operation diagram of the driving module of the autonomous mobile robot according to FIG. 1, FIG. 4 is a schematic explanatory view illustrating a process of the driving module of FIG. 3 climbing a step, and FIGS. 5 and 6 are schematic explanatory views illustrating the driving module of FIG. 2 variably controlling damping force.

The driving module 300 of the autonomous mobile robot 1 according to the embodiment of the present disclosure may include the first wheel 301 having a first rotational axis 308, the second wheel 302 having a second rotational axis 309, the third wheel 303 having a third rotational axis 310, a front bar 304, a rear bar 305, and a suspension unit 306.

The first wheel 301 may be in constant contact with the ground or the road surface. As described above, a pair of first wheels 301 may be installed coaxially on the left and right sides of the autonomous mobile robot 1.

In an example, it can be understood that the ground or the road surface collectively refers to any part of the path on which the autonomous mobile robot 1 is driving that comes into contact with the wheels, and includes all general roads, paved roads, unpaved roads, automobile roads, pedestrian roads, indoors, outdoors, and the like.

Next, the second wheel 302 and the third wheel 303 may be constrained in their positions relative to each other so as to be operated as one member. In an example, constraining the position relative to each other does not mean that the second wheel 302 and the third wheel 303 are absolutely fixed in position, but rather can be understood that the second wheel 302 and the third wheel 303 are limited in degrees of freedom such that the movement of one may affect the movement of the other. For example, the second wheel 302 and the third wheel 303 may concurrently pivot in the same rotational direction by a swinging motion about an intermediate axis portion 307, as will be described below.

In addition, like the first wheel 301, each of the second wheel 302 and the third wheel 303 may be installed in pair coaxially on the left and right sides of the autonomous mobile robot 1.

The second wheel 302 and the third wheel 303 may be driven by separate driving units, respectively. Alternatively, driving force may be provided to only one of the second wheel 302 and the third wheel 303 by a separate driving unit, and the other one may only be passively driven. Alternatively, none of the second wheel 302 and the third wheel 303 may be provided with the driving force. In this case, the autonomous mobile robot 1 may be driven only by the driving force of the first wheel 301.

Meanwhile, in order to transfer the driving force to the second wheel 302 or the third wheel 303, a motor may be installed in the front driving unit 230 or elsewhere. Alternatively, the motor may be installed adjacent to the second wheel 302 or the third wheel 303, or the motor may be directly connected to the second wheel 302 or the third wheel 303. In addition, the second wheel 302 or the third wheel 303 may be provided with an in-wheel motor.

Alternatively, the second wheel 302 and the third wheel 303 may be driven by one driving unit. For example, one motor may be installed in the front driving unit 230, and driving force of the motor may be simultaneously transmitted to the second wheel 302 and the third wheel 303 through a power transmission means such as a belt, chain, or the like. Alternatively, it is also possible to transmit the driving force to only one of the second wheel 302 and the third wheel 303 through the clutch means, or also to properly distribute the driving force to be transmitted to the second wheel 302 and the third wheel 303.

In addition, the second wheel 302 and the third wheel 303 may have the same radius.

Next, the front bar 304 may have a straight shape or similar bar shape. The third rotational axis 310 of the third wheel 303 may be positioned at one end of the front bar 304, and the other end of the front bar 304 may be pivotably coupled to the intermediate axis portion 307.

The rear bar 305 may also have a straight shape or similar bar shape. The second rotational axis 309 of the second wheel 302 may be positioned at one end of the rear bar 305, and an upper axis portion 311 may be provided at the other end of the rear bar 305. The intermediate axis portion 307 may be provided in the middle of the rear bar 305.

In an example, the distance from the intermediate axis portion 307 to the second rotational axis 309 of the second wheel 302, and the distance from the intermediate axis portion 307 to the third rotational axis 310 of the third wheel 303 may be equal to each other.

The suspension unit 306 may be provided between the rear bar 305 and the third wheel 303 or between the rear bar 305 and the front bar 304. To this end, one end of the suspension unit 306 may be pivotably coupled to the upper axis portion 311 of the rear bar 305, and the other end of the suspension unit 306 may be pivotably coupled to the third rotational axis 310 or the front bar 304.

The suspension unit 306 may include a damper and a spring. In addition, the suspension unit 306 may be formed with variable rigidity or variable damping force.

Meanwhile, the front bar 304 may be coupled to the intermediate axis portion 307 of the rear bar 305. In addition, the intermediate axis portion 307 may be provided in line with a swing drive axis that is swingably provided in the lower module 200 that forms the main body of the autonomous mobile robot 1. In this case, since the swing drive axis is substantially the same as the intermediate axis portion 307, it is not separately illustrated in the drawings.

As described above, the front bar 304 and the rear bar 305 may be formed to have a link frame in "ㅅ" shape which is capable of swinging motion and seesawing motion. Meanwhile, the relative positions of the front bar 304 and the rear bar 305, and of the third wheel 303 positioned on the front bar 304 and the second wheel 302 positioned on the rear bar 305 may be limited within certain ranges by the suspension unit 306.

This link frame structure capable of swinging motion/seesawing motion can initially attenuate the impact exerted on the autonomous mobile robot 1 on a bumpy or rough surface or a low-speed slow driving path where there are many obstacles. In addition, externally-exerted instantaneous impact, which is generated secondarily during high-speed driving, can be attenuated at the suspension unit 306.

The driving module 300 according to an embodiment of the present disclosure may further include a control unit for controlling the driving operation of the autonomous mobile robot 1. The control may control the swinging motion of the front bar 304 and the rear bar 305 about the swing drive axis to thereby adjust whether or not the second wheel 302 and the third wheel 303 are in contact with the ground or the road surface. A motor or other driving source for providing a driving force for the swinging motion may be separately provided.

FIG. 3A illustrates a state (first mode) in which both the second wheel 302 and the third wheel 303 are in contact with the ground or the road surface. The first mode may be adopted in a normal driving state or in a stationary state. In the first mode, the pre-load applied to the suspension unit 306 is decreased, which will be described below in detail.

FIG. 3B illustrates a state (second mode) in which the second wheel 302 is in contact with the ground or the road surface and the third wheel 303 is not in contact with the ground or the road surface. The second mode is suitable for overcoming (climbing) a stair, a step, or other obstacles or structures appearing in the driving direction. In the second mode, the suspension unit 306 is in a substantially inoperative state.

FIG. 3C illustrates a state (third mode) in which the second wheel 302 is not in contact with the ground or the road surface and the third wheel 303 is in contact with the ground or the road surface. The pre-load applied to the suspension unit 306 is greater in the third mode than in the first mode, which will be described below in detail.

As described above, the control unit may adjust whether or not the second wheel 302 and the third wheel 303 are in contact with the ground or the road surface to variably control the damping force of the suspension unit 306.

Meanwhile, since the driving module 300 according to the embodiment of the present disclosure has a link frame structure capable of swinging motion/seesawing motion, and accordingly, can climb a greater height than the driving device with general wheels. That is, compared to the general driving device that has the climbing height limited to or within the radius size of the wheel (that is, equal to or less than half of D1 illustrated in FIG. 4A), the driving module 300 according to the embodiment of the present disclosure has an increased climbing height that corresponds to the radius size (half of D2 illustrated in FIG. 4B) of an imaginary wheel formed by the third wheel 303 and the intermediate axis portion 307. In an example, the radius of the imaginary wheel formed by the third wheel 303 and the intermediate axis portion 307 may be referred to as a "swinging motion radius".

Therefore, in the case of general driving, or when the height H1 of a step placed on the ground or the road surface is smaller than the radius D1/2 of the third wheel 303, the control unit may control such that the driving is continued while both the second wheel 302 and the third wheel 303 are in contact with the ground or the road surface (see FIG. 4A).

Then, when the height H2 of a step on the ground or the road surface is greater than the radius (D1/2) of the third wheel 303 and less than the swinging motion radius (D2/2), it may control such that climbing the step is performed with the second wheel 302 remaining in contact with the ground or the road surface, but the third wheel 303 lifted from the ground or the road surface and maintained in a non-contacted state (see FIG. 4B).

Finally, when the height of a step on the ground or the road surface is greater than the swinging motion radius (D2/2), it may control such that a signal is generated, indicating that it is impossible to climb the step.

In addition, according to an embodiment of the present disclosure, since the suspension unit 306 is provided in the link frame structure capable of swinging motion/seesawing motion, the driving module 300 is able to variably control the damping force of the suspension unit 306 in consideration of the use environment (loading capacity, and the like) of the autonomous mobile robot, the ground environment, the traveling speed, and other internal and external factors. For example, even when a suspension is provided in the general driving device, the compressive strength of the suspension is only constantly or gradually changed according to a change in the load applied to the top of the driving device, and this may cause instability during driving. However, the driving module 300 according to the embodiment of the present disclosure may have an active torque suspension function of adjusting the damping force of the suspension unit 306 through instantaneous torque control by the rotation of the link frame structure capable of swinging motion/seesawing motion in a direction in which the suspension unit 306 is compressed. That is, the rigidity and softness of the suspension unit 306 can be controlled instantaneously.

This will be described in detail with reference to FIGS. 5 and 6.

First, when the load applied to the lower module 200 is less than a predetermined value, the control unit may cause both the second wheel 302 and the third wheel 303 to be in contact with the ground or the road surface so as to decrease the pre-load applied to the suspension unit 306 (see FIG. 5). Accordingly, the suspension unit 306 may be in a soft state. For example, in the autonomous mobile robot 1 used for logistics purposes, when not loaded or loaded with a certain weight or less, the pre-load of the suspension unit 306 is lowered to ensure sufficient damping force margin, thereby enabling stable driving.

Then, when the load applied to the lower module 200 is equal to or greater than a predetermined value, the control unit may control such that the second wheel 302 is lifted from the ground or the road surface to a non-contacted position, and the third wheel 303 is in contact with the ground or the road surface, to increase the pre-load applied to the suspension unit 306 (see FIG. 6). As a result, the suspension unit 306 may be in a stiff state. For example, when exceeding a certain loading capacity in the autonomous mobile robot 1, driving may be performed in a state in which the damping force is increased by increasing the pre-load of the suspension unit 306.

The difference in the shape of the suspension unit 306 in FIGS. 5 and 6 is to schematically illustrates the difference in the pre-load as described above.

However, the expression that the pre-load of the suspension unit 306 is high or low refers to the relative sizes according to whether the second wheel 302 and the third wheel 303 are in contact with the ground/road surface, and it does not necessarily mean that the pre-load applied to the suspension unit 306 in the state of FIG. 6 is greater than the pre-load applied to the suspension unit 306 in the state of FIG. 5. This is because the pre-load may vary according to the weight of the autonomous mobile robot 1 itself as well as the weight of the load.

Unlike the embodiments described above, or including the embodiments described above, the driving module 300 of the autonomous mobile robot 1 according to the present disclosure may be expressed as follows.

First, the driving module 300 of the autonomous mobile robot 1 may include the first wheel 301 in constant contact with the ground or the road surface and having the first rotational axis 308, the second wheel 302 having the second rotational axis 309, and the third wheel 303 having the third rotational axis 310.

In this example, the second wheel 302 and the third wheel 303 may be constrained to each other so as to be able to swing integrally about the intermediate axis portion 307 positioned separately from the second rotational axis 309 and the third rotational axis 310.

In addition, the driving module 300 of the autonomous mobile robot 1 may further include the suspension unit 306 connected to the second wheel 302 or the third wheel 303 and having a variable damping force. Whether or not the second wheel 302 and the third wheel 303 are in contact with the ground or the road surface can be adjusted according to the swinging motion, and accordingly, the damping force of the suspension unit 306 can be varied.

Accordingly, the front bar 304 and the rear bar 305 may have an inverted "𝖠" shape (that is, a "𝝺" shape) (see FIG. 2) as in the previous embodiment, but also have a "𝖠" shape or other shapes with other angles. Accordingly, the suspension unit 306 can not only be positioned on the front side of the autonomous mobile robot 1, but also positioned on the rear side. In addition, the front bar 304 and the rear bar 305 may have shapes other than straight lines, such as a "¬" shape or other shapes.

The foregoing description of the present disclosure is for illustrative purposes only, and those of ordinary skill in the art to which the present disclosure pertains will be able to understand that modifications to other specific forms can be easily performed without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

While the scope of the present disclosure is represented by the claims accompanying below, the meaning and the scope of the claims, and all the modifications or modified forms that can be derived from the equivalent concepts will have to be interpreted as falling into the scope of the present disclosure.

MODE FOR EMBODYING INVENTION

The mode for embodying the invention has been described above in the best mode for embodying the invention.

INDUSTRIAL APPLICABILITY

As described above, by adopting the driving module 300 according to the embodiment of the present disclosure, it is possible to easily overcome an obstacle or structure such as a step, a stair, or the like positioned on the ground or the road surface. That is, through the link frame structure including the front bar 304 and the rear bar 305 which is capable of swinging motion/seesawing motion, the climbing height is significantly increased to the radius of the swinging motion.

In addition, since the instantaneous control of the damping force of the suspension unit 306 is possible, driving performance can be enhanced. Since the climbing height enhancement or the instantaneous control of the damping force is possible without requiring a separate complex mechanical device or structure, the size of the autonomous mobile robot 1 can be kept compact, and no new spatial constraint is imposed on the design of the robot.

The invention claimed is:

1. A driving module of an autonomous mobile robot, comprising:
    a first wheel in constant contact with a ground or a road surface and having a first rotational axis;
    a second wheel and a third wheel constrained in their positions relative to each other;
    a rear bar on which a second rotational axis of the second wheel is positioned at one end, an upper axis portion is provided at the other end, and an intermediate axis portion is provided in the middle;
    a front bar on which a third rotational axis of the third wheel is positioned at one end, wherein the other end of the front bar is pivotably coupled to the intermediate axis portion;
    a suspension unit of which one end is pivotably coupled to the upper axis portion and the other end is pivotably coupled to the third rotational axis or the front bar; and
    a control unit that controls a swinging motion of the front bar and the rear bar about a swing drive axis based on a comparison a height of a step placed on the ground or the road surface and a radius of the third wheel or a swinging motion radius,
    wherein the control unit controls such that:
    i) in a general driving, or when a height of a step placed on the ground or the road surface is less than the radius of the third wheel, the driving is performed while both the second wheel and the third wheel are in contact with the ground or the road surface;
    ii) when the height of the step placed on the ground or the road surface is greater than the radius of the third wheel and less than the swinging motion radius, a climbing step is performed while the second wheel remains in a contacted state with the ground or the road surface and the third wheel is lifted from the ground or the road surface and maintained in a non-contacted state; and
    iii) when the height of the step on the ground or the road surface is greater than the swinging motion radius, a signal is generated, indicating that it is impossible to climb the step.

2. The driving module according to claim 1, wherein the intermediate axis portion is provided in line with the swing drive axis that is swingably provided in a lower module that forms a main body of the autonomous mobile robot.

3. The driving module according to claim 1, wherein the control unit adjusts whether or not the second wheel and the third wheel are in contact with the ground or the road surface to variably control a damping force of the suspension unit.

4. The driving module according to claim 3, wherein the control unit controls such that:
    i) when a load applied to the lower module is less than a predetermined value, both the second wheel and the third wheel are in contact with the ground or the road surface to decrease a pre-load applied to the suspension unit; and
    ii) when the load applied to the lower module is equal to or greater than the predetermined value, the second wheel is lifted from the ground or the road surface to a non-contacted position and the third wheel is in contact with the ground or the road surface, to increase the pre-load applied to the suspension unit.

5. The driving module according to claim 1, wherein the second wheel and the third wheel have the same radius.

6. The driving module according to claim 1, wherein a distance from the intermediate axis portion to the second rotational axis and a distance from the intermediate axis portion to the third rotational axis are equal to each other.

7. A driving module of an autonomous mobile robot, the driving module comprising:
    a first wheel in constant contact with a ground or a road surface and having a first rotational axis;
    a second wheel having a second rotational axis;
    a third wheel having a third rotational axis; and
    a control unit that controls a driving operation of the autonomous mobile robot, wherein:
    the second and third wheels are constrained to each other so as to be able to swing integrally about an intermediate axis portion positioned separately from the second and third rotational axes,
    the driving module further comprises a suspension unit connected to the second wheel or the third wheel and having a variable damping force, and
    whether or not the second wheel and the third wheel are in contact with the ground or the road surface is adjusted according to a swinging motion, and the damping force of the suspension unit is varied accordingly, and
    wherein the control unit controls a swinging motion of the second wheel and the third wheel about a swing drive axis based on a comparison a height of a step placed on the ground or the road surface and a radius of the third wheel or a swinging motion radius; and
    wherein the control unit controls such that:
    i) in a general driving, or when a height of a step placed on the ground or the road surface is less than the radius of the third wheel, the driving is performed while both the second wheel and the third wheel are in contact with the ground or the road surface;
    ii) when the height of the step placed on the ground or the road surface is greater than the radius of the third wheel and less than the swinging motion radius, a climbing step is performed while the second wheel remains in a contacted state with the ground or the road surface and the third wheel is lifted from the ground or the road surface and maintained in a non-contacted state; and
    iii) when the height of the step on the ground or the road surface is greater than the swinging motion radius, a signal is generated, indicating that it is impossible to climb the step.

* * * * *